US006255397B1

(12) United States Patent
Sandstrom

(10) Patent No.: US 6,255,397 B1
(45) Date of Patent: Jul. 3, 2001

(54) RUBBER COMPOSITION CONTAINING HYDROXYL TERMINATED LIQUID POLYMER AND TIRE WITH SIDEWALL THEREOF

(75) Inventor: Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/393,550

(22) Filed: Sep. 10, 1999

(51) Int. Cl.$^7$ .............. C08F 8/22; C08F 216/02; C08F 220/12; B60C 13/04

(52) U.S. Cl. .......... 525/192; 525/197; 525/328.8; 525/332.9; 525/331.9; 525/333.1; 525/333.2; 525/333.3; 525/333.4; 525/333.5; 525/334.1; 152/523; 152/524; 152/525; 152/DIG. 12

(58) Field of Search .................. 525/191, 192, 525/197, 328.8, 332.9, 331.9, 333.1, 333.2, 333.4, 333.5, 334.1; 152/523, 524, 525, DIG. 12

(56) References Cited

U.S. PATENT DOCUMENTS 5,504,164 * 4/1996 O'Donnell .............. 525/346
5,817,719 * 10/1998 Zanzig et al. ............ 125/212

* cited by examiner

Primary Examiner—David W. Wu
Assistant Examiner—R. Harlan
(74) Attorney, Agent, or Firm—Henry C Young, Jr

(57) ABSTRACT

This invention relates to a rubber composition comprised of a combination of cis 1,4-polybutadiene and at least one liquid hydroxyl terminated polyalkylene polymer together with a halogenated copolymer of isobutylene and p-methylstyrene and a minor amount of at least one conjugated diene-based elastomer, preferably cis 1,4-polyisoprene. The rubber composition contains particulate reinforcement as carbon black or as carbon black and silica together with a coupling agent. The invention also relates to a tire having a sidewall of such rubber composition.

103 Claims, No Drawings

RUBBER COMPOSITION CONTAINING HYDROXYL TERMINATED LIQUID POLYMER AND TIRE WITH SIDEWALL THEREOF

FIELD

This invention relates to a rubber composition comprised of a combination of cis 1,4-polybutadiene and at least one liquid hydroxyl terminated polyalkylene polymer together with a halogenated copolymer of isobutylene and p-methylstyrene and a minor amount of at least one conjugated diene-based elastomer, preferably cis 1,4-polyisprene. The rubber composition contains particulate reinforcement as carbon black or as carbon black and silica together with a coupling agent. The invention also relates to a tire having a sidewall of such rubber composition.

BACKGROUND

Pneumatic tires have sidewalls which are conventionally desired to have good flexibility yet be also scuff resistant.

Accordingly, scuff resistance is desirable for a tire sidewall. However, flexibility is also a conventionally required attribute for rubber tire sidewalls.

Historically, where a portion of a tire sidewall is of a color (e.g. white) in contrast with the remainder of tire, or sidewall (e.g. black), it is normally desired that the tire sidewall rubber composition be of a non-staining rubber composition to prevent, or at least retard, a staining of a tire sidewall having a color (e.g. white) other than the adjoining black color of the tire. This desirability is well known to those having skill in such art.

However, it is also well known that, in general, tire sidewall rubber compositions typically contain ingredients that are considered to be staining in nature for colored sidewalls such as, for example, amine-based antidegradants, unless a rubber composition adjoining the colored (e.g. white) rubber composition in the sidewall is especially compounded to not contain such staining ingredient (e.g. does not contain amine-based antidegradant).

Where it is desired that the sidewall rubber composition be non-staining in nature, or at least have a reduced tendency to stain, amine-based antidegradants are typically replaced with phenolic antioxidants in the rubber composition as is well known by those having skill in such art.

However, use of phenolic antioxidants for a rubber sidewall composition are usually not as desirable as amine-based antioxidants for tire sidewalls simply because they are not effective for protection against ozone attack and resultant degradation of various properties of sulfur-vulcanized rubber compositions of diene-based elastomers.

Historically, scuff resistance of a tire's rubber sidewall is conventionally enhanced, for example, by inclusion of cis 1,4-polybutadiene rubber in its rubber composition as is well known to those having skill in such art.

Historically, flexibility of a tire's rubber sidewall, while conventionally provided by an inclusion of cis 1,4-polyisoprene in blends with high cis 1,4-polybutadiene rubber in its rubber composition, particularly natural rubber, may sometimes also be enhanced by an inclusion of an aromatic rubber processing oil in its composition, as is well known by those having skill in such art.

It has been observed herein that the replacement of conventional rubber processing oils with selected hydroxyl terminated liquid polyalkylene-based polymers resulted in improved resistance to flex fatigue in the absence of amine-based antioxidants for a sulfur-cured tire sidewall rubber composition which was composed of cis 1,4-polybutadiene, a brominated copolymer of isobutylene and p-methylstyrene and a minor amount of cis 1,4-polyisoprene.

It has further been observed herein that a replacement of conventional rubber processing oil in a tire sidewall elastomer composition of natural rubber (cis 1,4-polyisoprene) and cis 1,4-polybutadiene with a staining antioxidant (an amine-based antidegradant) resulted in no improvement in tire sidewall rubber composition flex endurance related properties.

Therefore, a means of providing a tire with a suitably flexible sidewall yet maintaining resistance to ozone attack is desired in order to provide a tire sidewall of a conjugated diene rubber composition which also contains sufficient saturated, or essentially saturated with only minimal unsaturation, polymers so that it can be produced without a requirement for use of staining amine antidegradants.

Historically, it has sometimes been proposed to use various diene-based liquid polymers which contain carbon-to-carbon double bond unsaturation to replace at least a portion of rubber processing oil contained in various rubber compositions. One philosophy has been for the liquid polymer to initially enhance the processability of a high viscosity unvulcanized rubber composition by reducing its viscosity and to later co-vulcanize with the elastomer upon vulcanizing the rubber composition.

Such use of rubber processing oil and proposed use of unsaturated, diene-based liquid polymers is well known to those having skill in such art.

Indeed, while rubber processing oils have been used to improve the processability of various unvulcanized high viscosity elastomers, the inclusion of processing oils in such rubber compositions often results in a decrease in their vulcanized modulus of elasticity. Accordingly, the use of substantial amounts of processing oils in rubber compounds for a purpose of enhancing their unvulcanized processability is not necessarily a desirable option.

In the description of this invention, the term "phr" as used herein, and according to conventional practice, refers to "parts of a respective material per 100 parts by weight of rubber elastomer". The terms "rubber" and "elastomer" can be used interchangeably, unless otherwise distinguished. The terms "rubber composition", "compounded rubber" and "rubber compound" can be used interchangeably to refer to "rubber which has been blended or mixed with various ingredients and materials" and the terms "cure" and "vulcanize" may also be used interchangeably herein, unless otherwise noted and such terms are well known to those having skill in the rubber mixing or rubber compounding art.

PRACTICE AND SUMMARY OF THE INVENTION

This invention relates to a rubber composition comprised of, based upon 100 parts by weight per 100 parts by weight elastomers (phr) (A) 100 parts by weight of (i) about 30 to about 70, alternately about 35 to about 65, phr of cis 1,4-polybutadiene rubber and (ii) from zero to about 30, alternately about 5 to about 25, phr of cis 1,4-polyisoprene rubber, (B) about 2 to about 30, alternately about 5 to about 25, phr of liquid hydroxyl terminated polyalkylene polymer selected from at least one of (i) mono-hydroxyl terminated polymers with primary hydroxyl groups and (ii) di-hydroxyl terminated polymers with primary hydroxyl groups; wherein the alkylene mer units of said liquid polymer contains from 2 to 5, alternately from 2 to 4, carbon atoms, (C) about 30 to about 70, alternately about 40 to about 60, phr of brominated copolymer of isobutylene and p-methylstyrene, and (D) about 15 to about 70 phr of carbon black reinforcing filler and from zero to about 15 phr of amorphous silica.

It is a significant aspect of this invention that the rubber composition is suitable for a tire sidewall rubber composition where high flex endurance properties over a considerable period of time and good resistance to atmospheric ozone degradation without use of an amine-based antioxidant in the rubber composition itself is desired.

This is considered herein to be advantageous for a tire sidewall rubber composition in order to improve, or substantially maintain, visible tire sidewall surface appearance after aging while maintaining good durability properties of the sidewall rubber composition itself.

Such rubber composition may also contain up to about 15, alternately about 2 to about 15, phr of at least one additional diene-based elastomer selected from at least one of organic solvent solution polymerization prepared, or emulsion polymerization prepared, styrene/butadiene copolymer rubber, isoprene/butadiene copolymer and styrene/isoprene/butadiene terpolymer. Said additional solvent polymerization prepared elastomer may also be a tin coupled elastomer.

In practice, the cis 1,4-polyisoprene rubber for the rubber composition may be natural or synthetic rubber, usually preferably natural rubber.

In further accordance with this invention, an article of manufacture is provided having at least one component as the rubber composition of this invention.

In additional accordance with this invention, a tire is provided having at least one component as the rubber composition of this invention.

In further accordance with this invention, a tire, namely a rubber tire, is provided with a sidewall comprised of the rubber composition of this invention.

In practice, it is preferred that said reinforcement is carbon black. If desired, silica, particularly amorphous silica which can include an aluminosilicate, can be present at a level of up to 15 phr (e.g. from about 2 to about 15 phr). As would be understood by those having skill in such art, a coupling agent would normally be used for said silica, although the silica might be used exclusive of a coupling agent. Such coupling agent normally has a moiety reactive with hydroxyl groups on the surface of the silica (e.g. silanol groups) and another moiety interactive with a said elastomer (s).

Such coupling agent may be, for example, a bis-(3-triethoxysilylpropyl) polysulfide having an average of from 2 to 2.6 or from 3.5 to 4 connecting sulfur atoms in its polysulfide bridge.

In practice, the polyalkylene component for said polyalkylene of said hydroxyl terminated polyalkylene is derived by hydrogenating, for example, anionically polymerized isoprene, 1,3-butadiene or combination thereof, thereby yielding a hydroxyl terminated polyalkylene comprised of at least one of ethylene, propylene and butylene units.

In practice, said liquid hydroxyl terminated polyalkylene polymer preferably may have an equivalent weight range from about 250 to about 70,000, more preferably about 500 to about 7,000, so long as it is liquid at room temperature, or at about 23° C., namely that it is readily pourable at such temperature.

An example of suitable liquid hydroxyl terminated polyalkylene polymers are those available from Shell Chemical as Kraton L-1203 for a mono-hydroxyl terminated polymer and Kraton L-2203 for a di-hydroxyl terminated polymer.

The rubbery copolymer of post-halogenated isobutylene and para-alkylstyrene for this application is a copolymer comprising repeat units from an iso-olefin and para-alkylstyrene where the isoolefin may have from 4 to 7 carbon atoms and is preferably isobutylene. While the alkyl substituent of the para-alkylstyrene may have from 1 to 11 carbon atoms, preferably para-methylstyrene is used. Desirably, the para-alkylstyrene is composed of a least about 90 and usually at least about 95 percent unit derived from the para-methylstyrene. Therefore, for convenience herein, the "para-alkylstyrene" component may simply be referred to as "p-methylstyrene". Preferably ,the copolymer is from about 85 to about 99 weight percent units derived from isobutylene.

Desirably the copolymer is from about 1 to about 15 weight percent para-alkylstyrene, preferably para-methylstyrene.

Desirably, the copolymer is post-halogenated, preferably post-brominated with a halogen (e.g. bromine) content of up to about 5 weight percent and, more preferably, from about 0.2 to about 1.5 or even up to 2.5 weight percent in the copolymer. Post halogenation with other halogens (e.g. chlorine) is less preferred.

Conjugated diene monomers having from 4 to 8 carbon atoms may optionally be present in amounts up to about 5 or even to 8 weight percent and more desirably from about 0.5 to about 3 weight percent of the copolymer. The preferred copolymer of isobutylene and para-methylstyrene is essentially free of isoprene and other conjugated dienes (e.g. less than one percent and preferably less than 0.2 percent by weight of the copolymer.

A preferred copolymer is post-brominated copolymer of isobutylene and para-methylstyrene as, for example, EXXPRO from the Exxon Chemical Company reportedly having a Mooney Viscosity ML(1-8) at 125° C. of 50±10, an isobutylene content of about 94 to 95 weight percent, and a para-methylstyrene content of about 5 percent, with a total bromine content of about 0.8 weight percent. European patent publication No. EP 0.344.021 contains a description of how to make such copolymer. Also, reference may be made to European patent publication No. EP 0.801.105.

Such additional elastomers are typically derived from the polymerization of conjugated diene monomers which typically contain from 4 to 12 carbon atoms and preferably contain from 4 to about 8 carbon atoms.

Representative examples of such additional conjugated diene monomers include, for example, 1,3-butadiene and isoprene. The additional elastomer can also contain units derived from copolymerization of various vinyl aromatic monomers with one or more of such conjugated dienes such as, for example, styrene. An exemplary list of elastomers which can be prepared from the diene monomers and utilized in the rubber compositions of this invention include cis 1,4-polybutadiene, styrene/isoprene/butadiene rubber, styrene/butadiene rubber (SBR) whether solvent or emulsion polymerization prepared, isoprene/butadiene rubber and trans 1,4-polybutadiene.

The rubber compositions of this invention can be prepared by simply mixing the liquid hydroxyl terminated polyalkylene polymer into the rubber elastomer. This can be done utilizing a wide variety of mixing techniques. In most cases, the mixing will be carried out utilizing a Banbury mixer or a mill mixer. It will generally be preferred to mix the liquid polymer into the elastomer during the non-productive compounding stage.

However, in the alternative, the hydroxyl polyalkylene terminated polymer can be mixed throughout the elastomer in a separate mixing stage. In such case, it is advantageous to mix the hydroxyl liquid terminated liquid polymer into the elastomer before it is compounded with other materials to reap the benefits of improved processability during the preparation of the non-productive and productive compounds. It should be noted that the non-productive compounds do not contain a curative, such as sulfur, or accelerators for the curative. On the other hand, productive compounds contain a curative which will cure (vulcanize) the rubber after it is heated to a curing temperature.

The rubber compositions of this invention will frequently contain a variety of additional compounding ingredients and/or additives. Typical amounts of processing aids and rubber compounding ingredients comprise about 1 to about 50 phr. Such processing aids can include, for example, aromatic, naphthenic, and/or paraffinic processing oils. Stearic acid is typically referred to as a "rubber compounding ingredient". As purchased, it typically contains primarily stearic acid with small amounts of at least one of oleic acid, linolenic acid and/or palmitic acid. The mixture may also contain small amounts (less than about six weight percent) of myristic acid, arachidic acid and/or arachidonic acid. Such material, or mixture, is conventionally referred to in the rubber compounding art as "stearic acid".

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide, alkyl phenol polysulfides or sulfur olefin adducts. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from 2 to 2.5, being preferred. It is to be appreciated, however, that the cure system, including desired cure package ingredients as well as the following discussion concerning cure accelerators, may vary depending upon the rubber compound ingredients, including the chosen polymers and elastomers.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.8, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Some representative examples of primary accelerators which can be utilized include thiazole accelerators, such as benzothiazyldisulfide and 2-mercaptobenzothiazole; sulfenamide accelerators, such as N-oxydiethylene benzothiazole-2-sulfenamide, N-t-butyl-2-benzothiazolesulfenamide and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate; thiuram accelerators such as dipentamethylene thiuram hexasulfide, tetramethylthiuram monosulfide and tetraethylthiuram monosulfide; and thiourea accelerators, such as trimethyl thiourea and dimethylethyl thiourea. If a second accelerator is used, the secondary accelerator is preferably a guanidine, dithiocarbamate or thiuram compound.

As hereinbefore discussed in an alternative embodiment of this invention, the formulation can additionally contain silica, usually with a silica coupling agent; wherein the amount of particulate silica, namely an amorphous silica, ranges from about zero to about 15, optionally about 2 to about 10 or 15 phr and, wherein the silica coupling agent, if used, is used in an amount wherein the weight ratio of silica coupler to silica may be from about 0.1/1 to about 0.2/1.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

The following examples are used to illustrate the invention. The parts and percentages are by weight unless otherwise indicated.

EXAMPLE I

A series of samples were prepared to evaluate the use of liquid hydroxyl terminated polyalkylene polymers in diene-based rubber compositions which were reinforced with carbon black and referred to herein as Samples A–D.

The diene-based elastomers are cis 1,4-polybutadiene rubber and cis 1,4-polyisoprene natural rubber.

Control Sample A contained an aromatic rubber processing oil. It is to be appreciated that aromatic rubber processing are usually considered as being staining oils insofar as rubber compositions are concerned.

Samples B and C rubber compositions were similar to Control Sample A except that they contained liquid hydroxyl terminated polyalkylene polymers and did not contain the aromatic rubber processing oil of Control Sample A.

Sample D rubber composition was similar to Control Sample A except that they contained octadecanol and did not contain the aromatic rubber processing oil of Control Sample A.

The Sample A–D rubber compositions are prepared of ingredients shown in the following Table 4 which represents a formulation in which 3.5 phr of aromatic rubber processing oil is shown as being "variable".

Actual amounts of aromatic rubber processing oil are shown in the following Table 2.

The Samples are prepared in a two stage, sequential, mixing process in an internal rubber mixer, namely, a non-productive mixing stage in an internal rubber mixer followed by a productive mixing stage in an internal rubber mixer.

The elastomers, indicated compounding ingredients and processing oils are added in the first, non-productive mixing stage. The mixing is conducted in the first stage for about four minutes to a temperature of about 160° C., dumped from the internal mixer, open roll milled and cooled to below 30° C.

The sulfur curative and accelerator(s) are added in a subsequent, productive, mixing stage for about two and a half minutes to a temperature of about 110° C.

TABLE 1

|  | Parts |
|---|---|
| First Non-Productive Mix Stage | |
| Natural rubber[1] | 40 |
| Polybutadiene rubber[2] | 60 |
| Carbon black[3] | 50 |
| Resin oil as a tackifier[4] | 11 |
| Zinc oxide | 3.5 |
| Fatty acid[5] | 1 |
| Antdegradant[6] | 5.3 |
| Wax[7] | 1 |
| Processing oil[8] | variable |
| Mono-hydroxyl terminated polyalkylene polymer[9] | variable |
| Di-hydroxyl terminated polyalkylene polymer[10] | variable |
| Octadecanol | variable |
| Productive Mix Stage | |
| Sulfur | 1.6 |
| Accelerators[11] | 0.7 |

[1]Natural cis 1,4-polyisoprene rubber.
[2]Cis 1,4-polybutadiene rubber prepared by organic solvent solution polymerization as BUDENE ® 1207 from The Goodyear Tire & Rubber Company.
[3]N330 (ASTM designation)
[4]Resin oil plus phenol-based resin tackifier.
[5]Primarily stearic acid.
[6] Of the paraphenylene diamine types.
[7]Microcrystalline wax/paraffinic blend.
[8]Aromatic rubber processing oil obtained as Sundex 8125 from the Sun Oil company.
[9]Obtained as Kraton Liquid L-1203 from the Shell Chemical company.
[10]Obtained as Kraton Liquid L-2203 from the Shell Chemical company.
[11]Of the sulfenamide and the diphenylguanidine type.

The aforesaid series of Samples A–D, with Sample A being a Control, were prepared as described in this Example using the referenced "variable" amounts of processing oil and the Kraton liquid hydroxyl terminated polymers and octadecanol as shown in the following Table 2.

The rubber compositions were vulcanized in a suitable mold by heating for about 36 minutes to a temperature of about 150° C.

Various physical properties of the vulcanized rubber Samples A–D are also shown in the following Table 2.

The stress-strain, hardness, and rebound physical properties were determined with a ring tensile specimen on an automated basis via an Automated Testing System (ATS) instrument.

TABLE 2

|  | Sample A Control | Sample B | Sample C | Sample D |
|---|---|---|---|---|
| Ingredients | | | | |
| Processing oil, aromatic | 3.5 | 0 | 0 | 0 |
| Mono-hydroxyl terminated polyalkylene polymer | 0 | 3.5 | 0 | 0 |
| Di-hydroxyl terminated polyalkylene polymer | 0 | 0 | 3.5 | |
| octadecanol | | | | 3.5 |
| Properties | | | | |
| Rheometer (150° C.) | | | | |
| Max. torque, dNm | 26.7 | 25.7 | 25.7 | 26.7 |
| Min. torque, dNm | 6.5 | 6 | 6 | 6.3 |
| Delta torque | 20.2 | 19.7 | 19.6 | 20.4 |
| T$_{90}$, minutes | 19 | 20 | 21 | 19 |
| Stress-Strain | | | | |
| Tensile, MPa | 13.8 | 13.4 | 13.4 | 13.4 |
| Elongation, % | 713 | 714 | 709 | 696 |
| Modulus, 100%, MPa | 1.4 | 1.3 | 1.3 | 1.4 |
| Modulus, 300%, MPa | 5.0 | 4.7 | 4.7 | 5.0 |
| Rebound, 100° C., % | 60.1 | 58 | 58.1 | 63.2 |
| Hardness, Shore A, 100° C. | 46.2 | 44.6 | 44.7 | 46.1 |
| Tear strength, N, 95° C. | 136 | 114 | 121 | 121 |
| Ozone, visual evaluation[1] | | | | |
| Static[1], 25% | 0 | 0 | 0 | 0 |
| Kinetic[2], 25%[3] | Edges | Edges | Edges | Edges |
| Cyclic[3], 20 days | Edges | Edges | Edges | Edges |
| Rooftop, Kinetic[4] | 181 | 156 | 181 | 146 |

1. Static ozone test of the cured Samples, of a size of about 15.2 cm by 1.3 cm, in an enclosed container in an atmosphere which contains 50 pphm (parts per 100 million gaseous concentration) at about 23° C. and 25 percent strain (25% elongation) for about 48 hours. A visual rating of zero indicates no cracking of the sample.
2. The Kinetic test is conducted in a manner similar to the above Static test except that the Samples are dynamically continuously flexed, without relaxation, during the test. A visual inspection of the resulting Samples indicated cracks only at their edges.
3. The Cyclic test is conducted in a manner similar to the above Static test except that Samples undergo a series of continuous cycles of dynamic flexing and relaxing during the test. A visual inspection of the resulting Samples indicated cracks only at their edges.
4. The Rooftop test of the cured samples (Sample size is 15.2 by 1.3 cm) is conducted by exposing the Samples to atmospheric conditions on a testing apparatus located on a rooftop which continuously dynamically flexes the Samples, without relaxation, until failure or for about 365 days, whichever first occurs.

It is readily seen from Table 2 that the replacement of an aromatic processing oil with the liquid hydroxyl terminated polyalkylene polymers or octadecanol resulted in no improvement in physical properties of the cured Samples insofar as the aforesaid Static, Kinetic, Cyclic and Rooftop ozone exposure tests were concerned.

EXAMPLE II

A further series of Samples was prepared to evaluate the use of liquid hydroxyl terminated polyalkylene polymers in rubber compositions which contain cis 1,4-polybutadiene rubber, cis 1,4-polyisoprene rubber and a brominated copolymer of isobutylene and p-methylstyrene which may also contain a minor amount of isoprene.

The Samples are referred to herein as Samples E–H with Sample E being a Control Sample and of the same composition of Sample A of Example I. It was mixed in this study for comparative purposes.

Samples F–H contain the liquid hydroxyl terminated polyalkylene polymers, isobutylene/p-methylstyrene copolymer as well as cis 1,4-polyisoprene and cis 1,4-polybutadiene elastomers. One significant difference in the Samples E–H is the selection of oils for the individual formulations.

In particular, an elastomer composition is prepared from ingredients shown in Table 3 which represents a formulation in which the amount of liquid hydroxyl terminated polyalkylene polymer are used in Samples F and G and octadecanol is used in Sample H. Actual amounts of each processing oil and liquid hydroxyl terminated polyalkylene polymers, or octadecanol, are shown in Table 4 and the Samples thereof identified therein as Samples E–H together with various associated physical properties.

The Samples F–H are prepared in a three stage, sequential, mixing process in an internal rubber mixer, namely a first and second non-productive mixing stage followed by a productive mixing stage.

The elastomers, indicated compounding ingredients and liquid hydroxyl terminated polyalkylene polymer are added in the first, non-productive mixing stage. The second non-productive mixing stage is a re-mixing of the ingredients added in the aforesaid first mixing stage. The mixing is conducted in the first stage for about four minutes to a temperature of about 160° C., dumped from the internal mixer, open roll milled for about 30 seconds and cooled to below 30° C. The rubber composition is then re-mixed in the second mixing stage for about two minutes to a temperature of about 150° C. The mixture was dumped from the mixer, open roll milled for about 30 seconds and allowed to cool to below 30° C.

The sulfur curative and accelerator(s) are added in a subsequent productive mixing stage for about two minutes to a temperature of about 110° C.

The various ingredients are shown in the following Table 3. A second non-productive mixing in an internal rubber mixer is used between the first non-productive mix stage and productive mix stage, as hereinbefore described, and without additional ingredients.

TABLE 3

| | Parts |
|---|---|
| First Non-Productive Mix Stage | |
| Natural rubber[1] | 10 |
| Polybutadiene rubber[2] | 50 |
| Exxpro[3] | 40 |
| Carbon black[4] | 40 |
| Tackifier/fatty acid[5] | 11 |
| Naphthenic/paraffinic rubber processing oil[6] | 7 |
| Liquid polymer[7] | zero or 5 |
| Liquid polymer[8] | zero or 5 |
| Octadecanol | zero or 5 |
| Productive Mix Stage | |
| Zinc oxide | 0.75 |
| Stearic acid | 0.5 |
| Sulfur | 0.4 |
| Accelerators[9] | 1.9 |

[1]Natural cis 1,4-polyisoprene rubber.
[2]Cis 1,4-polybutadiene rubber prepared by organic solvent solution polymerization as BUDENE® 1207 from The Goodyear Tire & Rubber Company.
[3]Brominated copolymer of isobutylene and p-methylstyrene obtained as MDX 93-4 from the Exxon Chemical Company.
[4]N660 carbon black, an ASTM designation.
[5]Phenol-formaldehyde based resin and stearic acid.
[6]Naphthenic/paraffinic rubber processing oil as Flexon 641 from the Exxon company.
[7]Same as Example I.
[8]Same as Example I.
[9]Combination of benzothiazole disulfide (MBTS) and alkyl phenol polysulfide (Rylex 3010) from Ferro.

The Samples were prepared from the formulation represented in Table 3 using the referenced "variable" amounts of processing oil as shown in the following Table 4.

The rubber compositions were vulcanized in a suitable mold by heating for about 36 minutes to a temperature of about 150° C.

Various physical properties of the vulcanized rubber Samples E–H are also shown in the following Table 4.

The stress-strain, hardness, and rebound physical properties were determined with a ring tensile specimen on an automated basis via an Automated Testing System (ATS) instrument.

TABLE 4

| | Sample E Control | Sample F | Sample G | Sample H |
|---|---|---|---|---|
| Ingredients | | | | |
| Processing oil, aromatic | 0 | 7 | 7 | 7 |
| Mono-hydroxyl terminated polyalkylene polymer | 0 | 5 | 0 | 0 |
| Di-hydroxyl terminated polyalkylene polymer | 0 | 0 | 5 | 0 |
| Octadecanol | 0 | 0 | 0 | 5 |
| Properties | | | | |
| Rheometer (150° C.) | | | | |
| Max Torque, dNm | 27.0 | 23.7 | 23.0 | 23.9 |
| Min Torque, dNm | 5.4 | 4.3 | 4.5 | 4 |
| Delta torque | 21.6 | 19.4 | 18.5 | 19.9 |
| $T_{90}$, minutes | 19 | 19 | 18.5 | 19.9 |
| Stress-Strain | | | | |
| Tensile, MPa | 13.4 | 10.5 | 10.4 | 10.8 |
| Elongation, % | 677 | 605 | 596 | 657 |
| Modulus, 100%. MPa | 1.3 | 1.4 | 1.3 | 1.4 |
| Modulus, 300%, MPa | 5.2 | 5.3 | 5.0 | 4.8 |
| Rebound, 100° C., % | 57.8 | 64.9 | 67.6 | 69.1 |
| Hardness, Shore A, 100° C. | 45.7 | 42.2 | 41.0 | 41.5 |
| Tear strength, N, 95° C. | 132 | 39 | 38 | 38 |
| Ozone Testing[1] | | | | |
| Static test[1] | 0 | 0 | 0 | 0 |
| Kinetic[2], 25° C. | Edges | 0 | 0 | 0 |
| Cyclic[3], 18 days | Edges | 0 | 0 | 0 |
| Rooftop[4], Kinetic, | 185 | 193 | 434 | 193 |

TABLE 4-continued

|  | Sample E Control | Sample F | Sample G | Sample H |
|---|---|---|---|---|
| 25%, Kinetic days to failure (434 day test) |  |  |  |  |
| Pierced groove flex, cm/min. (240 min.)[5] | 0 | 0.0018 | 0 | 0.0069 |

1,2,3,4. The Static, Kinetic, Cyclic and Rooftop tests were conducted in a manner discussed in Example I.
5. The Pierced Groove Flex test is a measure of crack growth during dynamic continuous flexing without relaxation of the Sample and is expressed herein as a rate of cm/minutes; wherein a lower value is considered herein as being better.

The Static Ozone test visual results show that no cracking of the Samples was observed.

The Kinetic test visual results show that Samples F, G and H are better than the natural rubber/polybutadiene composed Control Sample E.

The Cyclic test visual results show the same superiority of Samples F, G and H over Control Sample E.

The Rooftop test visual results show that Samples F, G and H are equal to or better than the Control Sample E for flex life.

The Pierced Groove Flex test results show that the hydroxyl and di-hydroxyl polymer-containing rubber compositions, namely Samples F and G, illustrated the best cut growth resistance as compared to the octadecanol-containing Sample H.

It is readily seen from Table 4 that fatigue resistance properties, of cured Samples F and G are similar to or better than those of the Control Sample E and ozone resistance for cured Samples F, G and H is better than Control Sample E.

Sample H is observed to have improved ozone resistance compared to that of Control Sample E but not as good cut growth and flex resistance as cured Samples F and G.

This is considered herein to be particularly advantageous for a tire sidewall rubber composition because the Samples F–G exhibit cut growth flex life (resistance to flex fatigue) and excellent ozone resistance without the presence of the staining amine-based antidegradant used in Control Sample E.

EXAMPLE III

A series of additional Samples were prepared to evaluate the use of liquid hydroxyl terminated polyalkylene polymers in diene-based rubber compositions, which contained cis 1,4-polyisoprene, cis 1,4-polybutadiene elastomers as well as a brominated isobutylene/p-methylstyrene copolymer, and which were reinforced with carbon black and referred to herein as Samples I–K, with Sample I being a Control Sample.

Control Sample I is the same composition as Control Samples A and E in Examples I and II. It was mixed for this Example.

Sample J contained 12 phr of processing oil and the composition and mixing conditions are the same as shown in Table 3 for Samples F, G and H.

Samples K–N rubber compositions are similar to Sample J except that they contained liquid hydroxyl terminated polyalkylene polymers at 5 phr or 12 phr as replacements for the rubber processing oil of Sample J.

Control Sample I was prepared as described in Example I for Control Sample A. Samples K–N were prepared according to the sample preparation in Example II shown in Table 3.

Actual amounts of rubber processing oil and liquid hydroxyl terminated polyalkylene polymers are shown in the following Table 5.

The Samples (J–N) were prepared in a three stage, sequential, mixing process in an internal rubber mixer, namely, a first non-productive mixing stage in an internal rubber mixer in which the indicated ingredients were added, followed by a second non-productive mixing stage in an internal rubber mixer where no additional ingredients were added, followed by a productive mixing stage in an internal rubber mixer in which the sulfur curatives were added.

The rubber compositions were vulcanized in a suitable mold by heating for about 36 minutes to a temperature of about 150° C.

Various physical properties of the vulcanized rubber Samples I–N are also shown in the following Tables 5 and 5A.

TABLE 5

|  | Sample I Control | Sample J | Sample K |
|---|---|---|---|
| Ingredients |  |  |  |
| Processing oil, naphthenic/paraffinic | 0 | 12 | 7 |
| Mono-hydroxyl terminated polyalkylene polymer | 0 | 0 | 5 |
| Properties |  |  |  |
| Rheometer (150° C.) |  |  |  |
| Max Torque, dNm | 26.9 | 24 | 23.1 |
| Min Torque, dNm | 6.2 | 4.6 | 5.1 |
| Delta torque | 20.7 | 19.4 | 18 |
| $T_{90}$, minutes | 19.3 | 21.5 | 21.4 |
| Stress-Strain |  |  |  |
| Tensile, MPa | 13.8 | 9.3 | 9.3 |
| Elongation, % | 705 | 595 | 642 |
| Modulus, 100%, MPa | 1.3 | 1.3 | 1.3 |
| Modulus, 300%, MPa | 4.9 | 4.5 | 4.2 |
| Rebound, 100° C., % | 58.6 | 65.2 | 63.8 |
| Hardness, Shore A, 100° C. | 46 | 41 | 41 |
| Tear strength, N, 95° C. | 138 | 35 | 40 |
| Static[1], 25% | 0 | 0 | 0 |
| Kinetic[2], 25%[3] | Edges | 0 | 0 |
| Cyclic[3], 20 days | Edges | 0 | 0 |
| Rooftop, Kinetic[4], 372 days maximum | 83 | 24 | 373 |

TABLE 5A

|  | Sample L | Sample M | Sample N |
|---|---|---|---|
| Ingredients |  |  |  |
| Processing oil, naphthenic/paraffinic | 0 | 7 | 0 |
| Mono-hydroxyl terminated polyalkylene polymer | 12 | 5 | 12 |
| Properties |  |  |  |
| Rheometer (150° C.) |  |  |  |
| Max Torque, dNm | 21.9 | 23.7 | 22.5 |

TABLE 5A-continued

|  | Sample L | Sample M | Sample N |
|---|---|---|---|
| Min Torque, dNm | 5.1 | 5.5 | 5.4 |
| Delta torque | 16.8 | 18.2 | 17.1 |
| $T_{90}$, minutes | 19.9 | 21.4 | 21.2 |
| Stress-Strain |  |  |  |
| Tensile, MPa | 11.2 | 9.1 | 11 |
| Elongation, % | 715 | 638 | 698 |
| Modulus, 100%. MPa | 1.3 | 1.3 | 1.3 |
| Modulus, 300%, MPa | 4.4 | 4.1 | 4.3 |
| Rebound, 100° C., % | 62.5 | 65.1 | 61.1 |
| Hardness, Shore A, 100° C. | 40 | 41–40 | 41 |
| Tear strength, N, 95° C. | 42 | 30 | 45 |
| Static[1], 25% | 0 | 0 | 0 |
| Kinetic[2], 25%[3] | 0 | 0 | 0 |
| Cyclic[3], 20 days | 0 | 0 | 0 |
| Rooftop, Kinetic[4], 372 days maximum | 372 | 372 | 372 |

1. Static Ozone test conducted as in Example I. None of the Samples showed cracks.
2. Kinetic test conducted as in Example I. Only Control Sample I showed cracks and then only at its edges.
3. Cyclic test conducted as in Example I. Only Control Sample I showed cracks and then only at its edges.
4. Rooftop test of the cured samples conducted as in Example I, however, with a maximum of 372 days exposure. Sample J and Control Sample I showed cracking after 24 and 83 days, respectively, while Samples K–N showed no cracking after 372 days.

It is readily seen from Table 5 that the replacement of a naphthenic/paraffinic processing oil with the liquid hydroxyl terminated polyalkylene polymers resulted in an improvement in Kinetic, Cyclic and Rooftop ozone test results.

This is considered herein to be significant because an improved sidewall appearance obtained without ozone cracking of the rubber compound normally requires the use of non-staining antidegradants. Also, as hereinbefore discussed, the use of non-staining antidegradants often provides poor flex behavior of the rubber compound. However, it is shown in this Example that the combination of good ozone resistance and flex resistance is obtainable without the use of amine type (non-staining) antidegradants.

It is also readily observed from Table 5 that Samples K–N are superior to Control Sample I of the natural rubber/cis 1,4-polybutadiene rubber composition as well as Control J which used the same rubber composition without the liquid hydroxyl terminated polyalkylene polymers.

What is claimed is:

1. A rubber composition comprised of, based upon 100 parts by weight per 100 parts by weight elastomers (phr) (A) 100 parts by weight of (i) about 30 to about 70 phr of cis 1,4-polybutadiene rubber and (ii) from zero to about 30 phr of cis 1,4-polyisoprene rubber, (B) about 2 to about 30 phr of liquid hydroxyl terminated polyalkylene polymer selected from the group consisting of at least one of (i) mono-hydroxyl terminated polymers with primary hydroxyl groups and (ii) di-hydroxyl terminated polymers with primary hydroxyl groups; wherein the alkylene mer units of said liquid polymer contains from 2 to 5 carbon atoms, (C) about 30 to about 70 phr of brominated copolymer of isobutylene and p-methylstyrene, and (D) reinforcing filler comprised of about 15 to about 70 phr of carbon black reinforcing filler and from zero to 20 phr of amorphous silica.

2. The rubber composition of claim 1 wherein said elastomers are comprised of (i) about 35 to about 65 phr of cis 1,4-polybutadiene and (ii) about 5 to about 25 phr of cis 1,4-polyisoprene.

3. The rubber composition of claim 2 wherein said cis 1,4-polyisoprene is natural rubber.

4. The rubber composition of claim 1 wherein said rubber composition also contains about 5 to about 15 phr of at least one additional elastomer selected from organic solvent polymerization prepared or emulsion polymerization prepared styrene/butadiene copolymer, isoprene/butadiene copolymer rubber and styrene/isoprene/butadiene terpolymer.

5. The rubber composition of claim 2 wherein said rubber composition also contains about 5 to about 15 phr of at least one additional elastomer selected from organic solvent polymerization prepared or emulsion polymerization prepared styrene/butadiene copolymer, isoprene/butadiene copolymer rubber and styrene/isoprene/butadiene terpolymer.

6. The rubber composition of claim 5 wherein said additional solvent polymerization prepared elastomer is a tin coupled elastomer.

7. The rubber composition of claim 1 wherein said brominated copolymer is comprised of about 85 to about 99 weight percent units derived from isobutylene.

8. The rubber composition of claim 2 wherein said brominated copolymer is comprised of about 85 to about 99 weight percent units derived from isobutylene.

9. The rubber composition of claim 3 wherein said brominated copolymer is comprised of about 85 to about 99 weight percent units derived from isobutylene.

10. The rubber composition of claim 4 wherein said brominated copolymer is comprised of about 85 to about 99 weight percent units derived from isobutylene.

11. The rubber composition of claim 5 wherein said brominated copolymer is comprised of about 85 to about 99 weight percent units derived from isobutylene.

12. The rubber composition of claim 6 wherein said brominated copolymer is comprised of about 85 to about 99 weight percent units derived from isobutylene.

13. The rubber composition of claim 7 wherein said brominated copolymer also contains from about 0.5 to about three weight percent units derived from isoprene.

14. The rubber composition of claim 1 wherein the hydroxyl terminated polyalkylene is an hydrogenated elastomer of anionically polymerized isoprene, 1,3-butadiene or combination thereof.

15. The rubber composition of claim 2 wherein the hydroxyl terminated polyalkylene is an hydrogenated elastomer of anionically polymerized isoprene, 1,3-butadiene or combination thereof.

16. The rubber composition of claim 1 wherein said polyalkylene portion of said hydroxyl terminated polyalkylene comprised of at least one of ethylene, propylene and butylene units.

17. The rubber composition of claim 2 wherein said polyalkylene portion of said hydroxyl terminated polyalkylene comprised of at least one of ethylene, propylene and butylene units.

18. The rubber composition of claim 1 wherein said liquid hydroxyl terminated polyalkylene polymer has an equivalent weight range from about 250 to about 70,000, provided that it is liquid at about 23° C.

19. The rubber composition of claim 2 wherein said liquid hydroxyl terminated polyalkylene polymer has an equivalent weight range from about 250 to about 70,000, provided that it is liquid at about 23° C.

20. The rubber composition of claim 1 wherein said liquid hydroxyl terminated polyalkylene polymer is a monohydroxyl terminated polymer.

21. The rubber composition of claim 2 wherein said liquid hydroxyl terminated polyalkylene polymer is a mono-hydroxyl terminated polymer.

22. The rubber composition of claim 3 wherein said liquid hydroxyl terminated polyalkylene polymer is a mono-hydroxyl terminated polymer.

23. The rubber composition of claim 4 wherein said liquid hydroxyl terminated polyalkylene polymer is a mono-hydroxyl terminated polymer.

24. The rubber composition of claim 5 wherein said liquid hydroxyl terminated polyalkylene polymer is a mono-hydroxyl terminated polymer.

25. The rubber composition of claim 6 wherein said liquid hydroxyl terminated polyalkylene polymer is a mono-hydroxyl terminated polymer.

26. The rubber composition of claim 7 wherein said liquid hydroxyl terminated polyalkylene polymer is a mono-hydroxyl terminated polymer.

27. The rubber composition of claim 8 wherein said liquid hydroxyl terminated polyalkylene polymer is a mono-hydroxyl terminated polymer.

28. The rubber composition of claim 9 wherein said liquid hydroxyl terminated polyalkylene polymer is a mono-hydroxyl terminated polymer.

29. The rubber composition of claim 10 wherein said liquid hydroxyl terminated polyalkylene, polymer is a mono-hydroxyl terminated polymer.

30. The rubber composition of claim 11 wherein said liquid hydroxyl terminated polyalkylene polymer is a mono-hydroxyl terminated polymer.

31. The rubber composition of claim 12 wherein said liquid hydroxyl terminated polyalkylene polymer is a mono-hydroxyl terminated polymer.

32. The rubber composition of claim 13 wherein said liquid hydroxyl terminated polyalkylene polymer is a mono-hydroxyl terminated polymer.

33. The rubber composition of claim 14 wherein said liquid hydroxyl terminated polyalkylene polymer is a mono-hydroxyl terminated polymer.

34. The rubber composition of claim 15 wherein said liquid hydroxyl terminated polyalkylene polymer is a mono-hydroxyl terminated polymer.

35. The rubber composition of claim 16 wherein said liquid hydroxyl terminated polyalkylene polymer is a mono-hydroxyl terminated polymer.

36. The rubber composition of claim 17 wherein said liquid hydroxyl terminated polyalkylene polymer is a mono-hydroxyl terminated polymer.

37. The rubber composition of claim 18 wherein said liquid hydroxyl terminated polyalkylene polymer is a mono-hydroxyl terminated polymer.

38. The rubber composition of claim 19 wherein said liquid hydroxyl terminated polyalkylene polymer is a mono-hydroxyl terminated polymer.

39. The rubber composition of claim 1 wherein said liquid hydroxyl terminated polyalkylene polymer is a di-hydroxyl terminated polymer.

40. The rubber composition of claim 2 wherein said liquid hydroxyl terminated polyalkylene polymer is a di-hydroxyl terminated polymer.

41. The rubber composition of claim 3 wherein said liquid hydroxyl terminated polyalkylene polymer is a di-hydroxyl terminated polymer.

42. The rubber composition of claim 4 wherein said liquid hydroxyl terminated polyalkylene polymer is a di-hydroxyl terminated polymer.

43. The rubber composition of claim 5 wherein said liquid hydroxyl terminated polyalkylene polymer is a di-hydroxyl terminated polymer.

44. The rubber composition of claim 6 wherein said liquid hydroxyl terminated polyalkylene polymer is a di-hydroxyl terminated polymer.

45. The rubber composition of claim 7 wherein said liquid hydroxyl terminated polyalkylene polymer is a di-hydroxyl terminated polymer.

46. The rubber composition of claim 8 wherein said liquid hydroxyl terminated polyalkylene polymer is a di-hydroxyl terminated polymer.

47. The rubber composition of claim 9 wherein said liquid hydroxyl terminated polyalkylene polymer is a di-hydroxyl terminated polymer.

48. The rubber composition of claim 10 wherein said liquid hydroxyl terminated polyalkylene polymer is a di-hydroxyl terminated polymer.

49. The rubber composition of claim 11 wherein said liquid hydroxyl terminated polyalkylene polymer is a di-hydroxyl terminated polymer.

50. The rubber composition of claim 12 wherein said liquid hydroxyl terminated polyalkylene polymer is a di-hydroxyl terminated polymer.

51. The rubber composition of claim 13 wherein said liquid hydroxyl terminated polyalkylene polymer is a di-hydroxyl terminated polymer.

52. The rubber composition of claim 14 wherein said liquid hydroxyl terminated polyalkylene polymer is a di-hydroxyl terminated polymer.

53. The rubber composition of claim 15 wherein said liquid hydroxyl terminated polyalkylene polymer is a di-hydroxyl terminated polymer.

54. The rubber composition of claim 16 wherein said liquid hydroxyl terminated polyalkylene polymer is a di-hydroxyl terminated polymer.

55. The rubber composition of claim 17 wherein said liquid hydroxyl terminated polyalkylene polymer is a di-hydroxyl terminated polymer.

56. The rubber composition of claim 18 wherein said liquid hydroxyl terminated polyalkylene polymer is a di-hydroxyl terminated polymer.

57. The rubber composition of claim 19 wherein said liquid hydroxyl terminated polyalkylene polymer is a di-hydroxyl terminated polymer.

58. The rubber composition of claim 1 wherein said liquid hydroxyl terminated polyalkylene polymer is comprised of at least one mono-hydroxyl terminated polymer and at least one di-hydroxyl terminated polymer.

59. The rubber composition of claim 2 wherein said liquid hydroxyl terminated polyalkylene polymer is comprised of at least one mono-hydroxyl terminated polymer and at least one di-hydroxyl terminated polymer.

60. The rubber composition of claim 1 wherein said reinforcement is carbon black.

61. The rubber composition of claim 2 wherein said reinforcement is carbon black.

62. The rubber composition of claim 4 wherein said reinforcement is carbon black.

63. The rubber composition of claim 6 wherein said reinforcement is carbon black.

64. The rubber composition of claim 7 wherein said reinforcement is carbon black.

65. The rubber composition of claim 14 wherein said reinforcement is carbon black.

66. The rubber composition of claim 20 wherein said reinforcement is carbon black.

67. The rubber composition of claim 21 wherein said reinforcement is carbon black.

68. The rubber composition of claim 39 wherein said reinforcement is carbon black.

69. The rubber composition of claim 40 wherein said reinforcement is carbon black.

70. The rubber composition of claim 1 wherein said reinforcement is carbon black and amorphous silica; wherein said silica is present in an amount of from 2 to about 15 phr and is exclusive of silica coupling agent.

71. The rubber composition of claim 1 wherein said reinforcement is carbon black and amorphous silica; wherein said silica is present in an amount of from 2 to about 15 phr and contains a silica coupling agent having a moiety reactive with hydroxyl groups on the surface of said silica and another moiety interactive with said elastomer(s).

72. The rubber composition of claim 72 wherein said coupling agent is a bis (3-triethoxysilylpropyl)polysulfide having an average of from 2 tb 2.6 or from 3.5 to 4 connecting sulfur atoms in its polysulfide bridge.

73. The rubber composition of claim 2 wherein said reinforcement is carbon black and amorphous silica; wherein said silica is present in an amount of from 2 to about 15 phr and contains a silica coupling agent having a moiety reactive with hydroxyl groups on the surface of said silica and another moiety interactive with said elastomer(s).

74. The rubber composition of claim 7 wherein said reinforcement is carbon black and amorphous silica; wherein said silica is present in an amount of from 2 to about 15 phr and contains a silica coupling agent having a moiety reactive with hydroxyl groups on the surface of said silica and another moiety interactive with said elastomer(s).

75. The rubber composition of claim 14 wherein said reinforcement is carbon black and amorphous silica; wherein said silica is present in an amount of from 2 to about 15 phr and contains a silica coupling agent having a moiety reactive with hydroxyl groups on the surface of said silica and another moiety interactive with said elastomer(s).

76. The rubber composition of claim 20 wherein said reinforcement is carbon black and amorphous silica; wherein said silica is present in an amount of from 2 to about 15 phr and contains a silica coupling agent having a moiety reactive with hydroxyl groups on the surface of said silica and another moiety interactive with said elastomer(s).

77. An article of manufacture having at least one component comprised of the rubber composition of claim 1.

78. An article of manufacture having at least one component comprised of the rubber composition of claim 2.

79. An article of manufacture having at least one component comprised of the rubber composition of claim 7.

80. An article of manufacture having at least one component comprised of the rubber composition of claim 14.

81. An article of manufacture having at least one component comprised of the rubber composition of claim 20.

82. An article of manufacture having at least one component comprised of the rubber composition of claim 39.

83. A tire having at least one component comprised of the rubber composition of claim 1.

84. A tire having at least one component comprised of the rubber composition of claim 2.

85. A tire having at least one component comprised of the rubber composition of claim 4.

86. A tire having at least one component comprised of the rubber composition of claim 7.

87. A tire having at least one component comprised of the rubber composition of claim 14.

88. A tire having at least one component comprised of the rubber composition of claim 16.

89. A tire having at least one component comprised of the rubber composition of claim 20.

90. A tire having at least one component comprised of the rubber composition of claim 21.

91. A tire having a at least one component comprised of the rubber composition of claim 39.

92. A tire having at least one component comprised of the rubber composition of claim 40.

93. A tire having a sidewall comprised of the rubber composition of claim 1.

94. A tire having a sidewall comprised of the rubber composition of claim 2.

95. A tire having a sidewall comprised of the rubber composition of claim 4.

96. A tire having a sidewall comprised of the rubber composition of claim 6.

97. A tire having a sidewall comprised of the rubber composition of claim 7.

98. A tire having a sidewall comprised of the rubber composition of claim 14.

99. A tire having a sidewall comprised of the rubber composition of claim 16.

100. A tire having a sidewall comprised of the rubber composition of claim 20.

101. A tire having a sidewall comprised of the rubber composition of claim 21.

102. A tire having a sidewall comprised of the rubber composition of claim 39.

103. A tire having a sidewall comprised of the rubber composition of claim 40.

* * * * *